Oct. 13, 1925.
F. W. SHIELDS
1,557,100
PRODUCE CLEANING, DISTRIBUTING, SORTING AND PACKING MACHINE
Filed Dec. 6, 1923    4 Sheets-Sheet 1
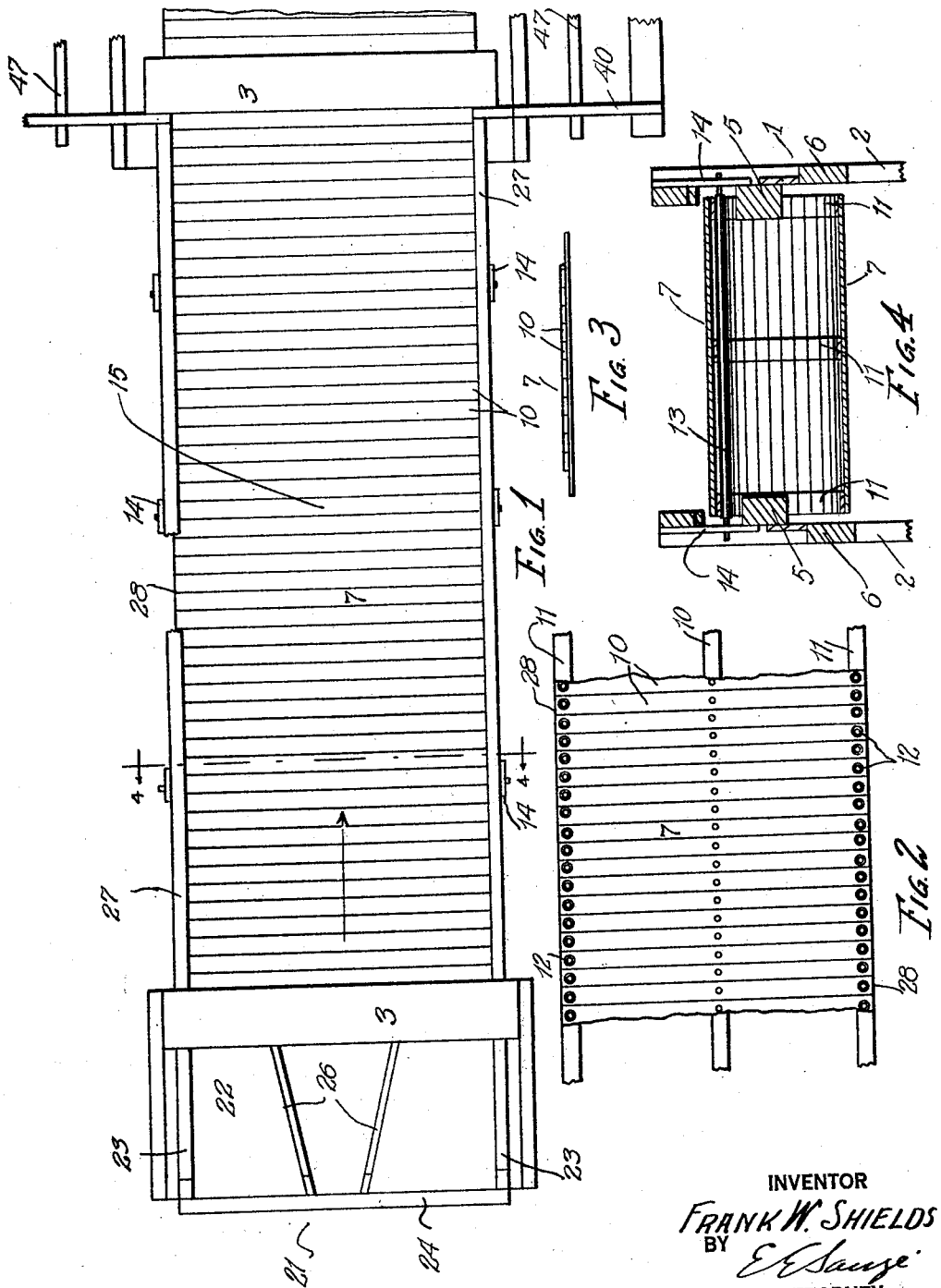
INVENTOR
FRANK W. SHIELDS
BY
ATTORNEY

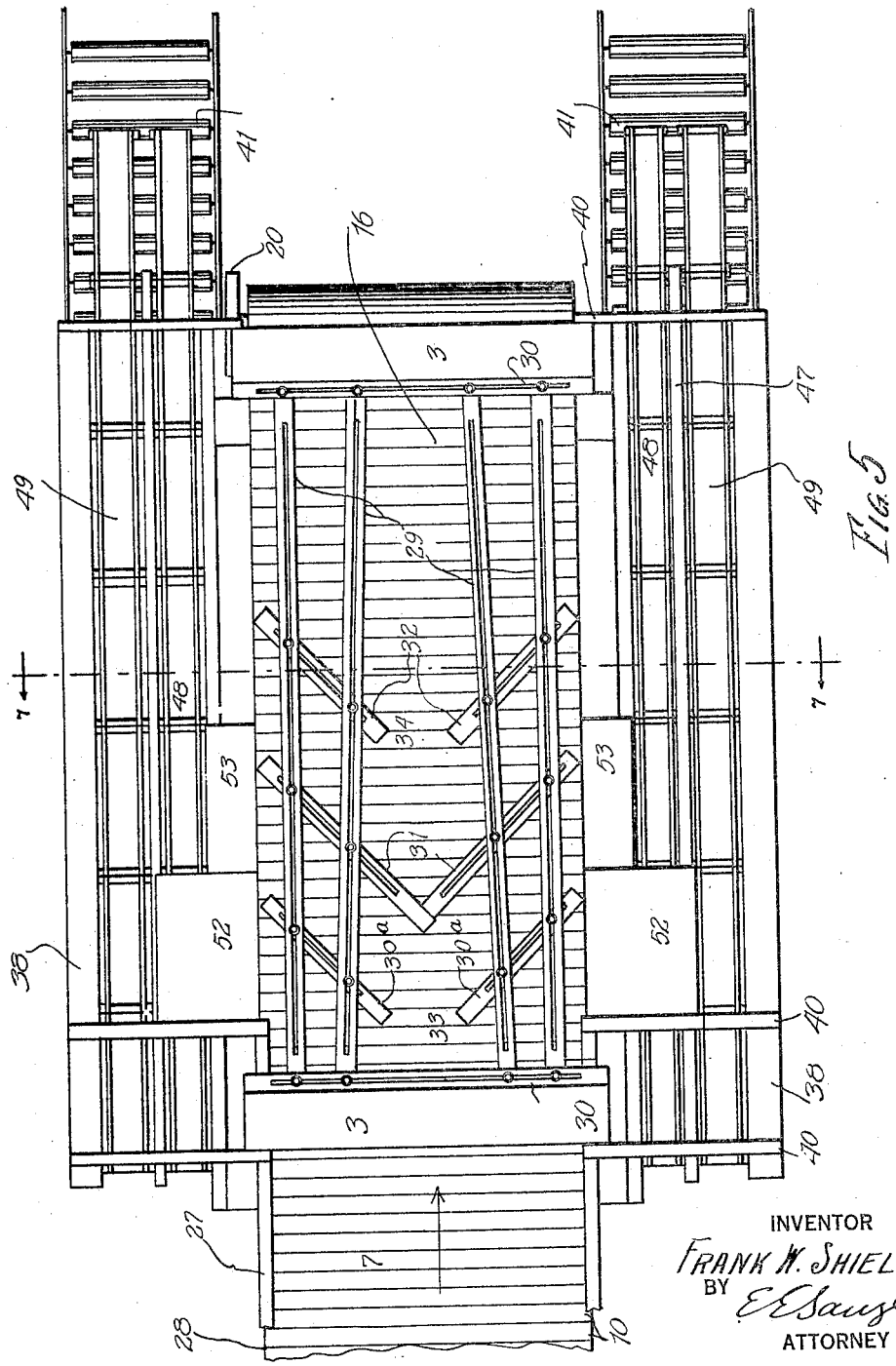

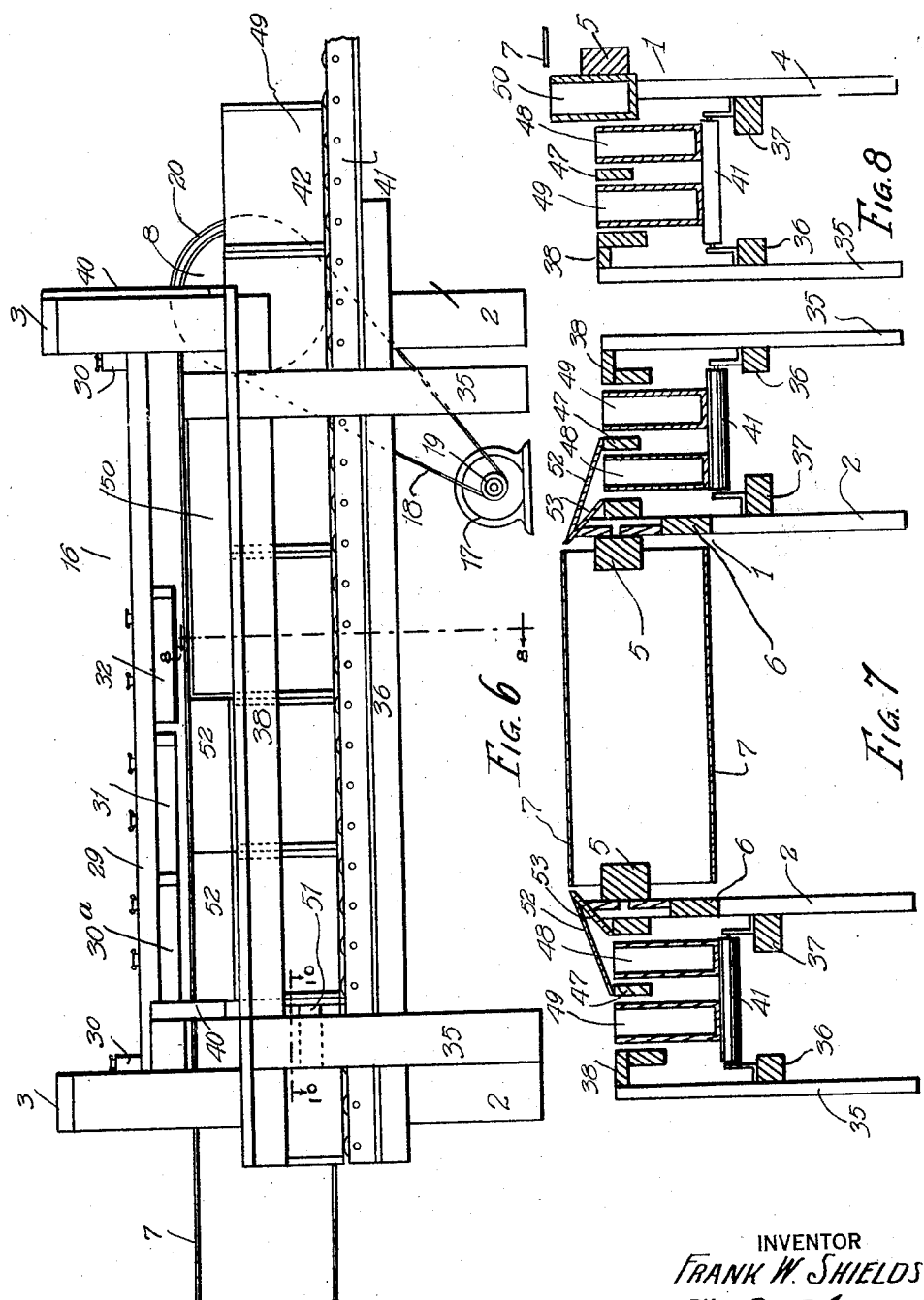

Oct. 13, 1925.
F. W. SHIELDS
1,557,100
PRODUCE CLEANING, DISTRIBUTING, SORTING AND PACKING MACHINE
Filed Dec. 6, 1923      4 Sheets-Sheet 4
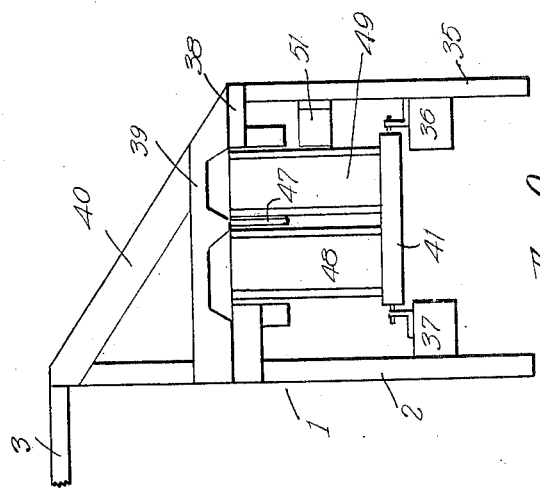
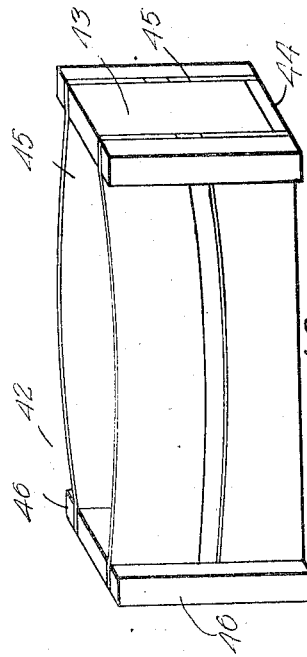
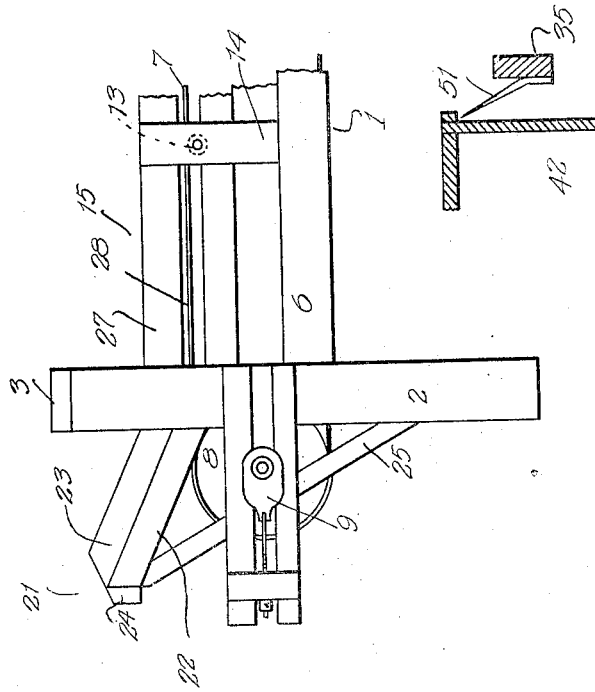
INVENTOR
FRANK W. SHIELDS
BY
*E. E. Savage*
ATTORNEY Patented Oct. 13, 1925.

1,557,100

UNITED STATES PATENT OFFICE.

FRANK W. SHIELDS, OF WALLA WALLA, WASHINGTON, ASSIGNOR TO VALLEY FRUIT COMPANY INCORPORATED, OF WALLA WALLA, WASHINGTON, A CORPORATION OF WASHINGTON.

PRODUCE CLEANING, DISTRIBUTING, SORTING, AND PACKING MACHINE.

Application filed December 6, 1923. Serial No. 678,893.

*To all whom it may concern:*

Be it known that I, FRANK W. SHIELDS, a citizen of the United States, residing at Walla Walla, in the county of Walla Walla and State of Washington, have invented certain new and useful Improvements in Produce Cleaning, Distributing, Sorting, and Packing Machines, of which the following is a specification.

This invention relates to produce cleaning, distributing, sorting and packing machines and has as one of its objects to provide a machine whereby bulk produce may be handled in quantities, for deposit in its final package.

Another object of the invention is to provide a machine whereby the deposited produce will be precleaned of leaves, twigs, and other foreign matter.

A further object of the invention is to provide a machine whereby a plurality of rows of packages may be filled simultaneously, on either or both sides of the machine, and with a continuous movement.

A further object of the invention is to provide a machine whereby the imperfect may be sorted from the perfect produce in an automatic manner.

With these and other objects in view reference is now had to the accompanying drawings in which—

Fig. 1 is a plan view of the feeding and cleaning portion of the machine;

Fig. 2 is a plan view of a fragment of the conveyor table;

Fig. 3 is an end elevation of a fragment of the conveyor table;

Fig. 4 is a sectional view on the line 4—4 of Fig. 1, omitting however the distributing means;

Fig. 5 is a plan view of the distributing portion of the machine;

Fig. 6 is a side elevation of the distributing portion of the machine;

Fig. 7 is a sectional view on the line 7—7 of Fig. 5;

Fig. 8 is a sectional view on the line 8—8 of Fig. 6;

Fig. 9 is an elevation showing details of the suitcase feeding end of the machine;

Fig. 10 is a plan view, in section, of the signalling device, enlarged;

Fig. 11 is a side elevation of the feeding chute; and

Fig. 12 is a perspective view of a suitcase.

Having reference to the drawings like numerals refer to like parts throughout the several views and the numeral 1 refers to the frame of the machine which consists of leg members 2 which are extended upward above the machine to provide for tie pieces 3, short leg members 4 that may be interspersed throughout the length of the machine should necessity require, sills 5 attached to the inside of the leg members, and side rails 6 preferably mortised into the leg members to provide rigidity to the frame.

A movable produce carrying table comprising a conveyor 7 is operably mounted in the frame on drums 8 journalled therein in any approved manner, one of the drums being slidably mounted and provided with a tightening means 9 wherewith to tighten the conveyor, while the other drum remains fixed against horizontal motion.

The conveyor proper consists of relatively thin and narrow slats 10 attached to belting 11 by means of rivets 12, and the larger stretches of the conveyor are supported by rollers 13 suitably journalled in upright pieces 14 provided for the purpose, these pieces being substantially attached at one end to the sills 6 and at the other end to guard rails which will be presently explained.

The conveyor table, which will now be termed the "table", is divided into two portions, one of which portions extends from the feeding chute, to be explained, and forms a cleaning table 15, and the other of which portions form a distributing and sorting table 16.

The table is operated by means of a motor 17, or other prime mover, and the motor may be suitably attached to the floor, and positioned as shown, or to any desirable part of the machine, and is operably connected to the drum 8 through the medium of the belt 18, and a pulley 19 operated by the motor, and a pulley 20 suitably fastened to the axle (not shown) of the drum 8.

The machine is provided at one end with a feeding chute 21 which consists of an inclined floor 22 having side rails 23 and a breast board 24, and is supported by diagonal pieces 25 suitably attached to the legs 2 of the machine.

As the machine is designed to work from either or both its sides the feeding chute is provided on its inclined floor with dividing boards 26, which may be rigidly or adjustably attached thereto, and by which the produce may be initially directed to even distribution over the table, or to either side of the table as the circumstances demand.

By means of these dividing boards the produce may also be unevenly distributed to either side so that in case of shortage of help, or for any other cause, the machine may be kept in continuous operation avoiding all delays.

As practically all produce is of a more or less spherical form a guard rail 27 is provided to prevent the produce from rolling from the moving table 7.

The guard rail extends throughout the cleaning portion 15 of the table and is positioned above and parallel to the edges 28 of the table, and answers the double purpose of preventing the clothing of an operator (many of whom are women) from being caught by the moving conveyor, as well as preventing the loss of produce by rolling therefrom.

Cooperating with the movable table, to form a combined distributing and sorting means, are a plurality of slotted adjusting bars 29 spaced apart and positioned in a relatively parallel position above the table 7, with the ends thereof adjustably mounted in similarly slotted end bars 30 that are rigidly attached to the upper portion of the legs 2.

Positioned below the bars 29 and adjustably attached thereto are other bars 30$^a$, 31 and 32 respectively, which are positioned with respect to the table, in operable contiguity therewith.

The forward of these bars 30$^a$ are positioned with respect to each other so that a gap 33 is provided between their inner ends and their outer ends rest at or near the edge 28 of the table.

The intermediate bars 31 are closed together at their inner ends and have their outer ends likewise resting at or near the edge of the table, and the rearward bars 32 are positioned similar to the forward bars and are likewise provided with a gap 34 between their inner ends.

The forward and intermediate bars form distributing gates and are positioned above the table at a distance to intercept the perfect produce and to permit the passage thereunder of the undersized produce (see Fig. 6), and are placed at an angle with the table to divert and discharge the produce from the table.

Now, as the produce is carried along by the moving table, a part thereof is intercepted by the forward bars 30$^a$ and diverted as above mentioned, and the other part of the produce passes through the gap 33 to be intercepted by the intermediate bars 31 which divert it at another position on the table.

By this means the produce may be diverted to both sides of the machine, and may also be diverted at different places on both sides, and further the diversions will be simultaneous and continuous.

The rearward bars 32 form sorting gates and these gates are positioned above the table, as shown in Fig. 6, a distance to intercept and divert the undersized produce, and yet to permit the passage of the smaller waste stuff such as leaves, twigs, and the like, to be eventually deposited over the end of the conveyor, in a pile for ready removal.

This gate is also placed at an angle for the purpose of diversion and discharges this undersized produce from the table in a like manner to that above mentioned.

Thus the produce is distributed to either side of the machine, and at various places thereon, and it is sorted so that the perfect produce and the undersized produce is separated, and the leaves and twigs are likewise separated from the undersized produce. In this manner the latter separation provides a means to gather together the inferior produce that may have some market value, and which otherwise might be a total waste.

On each side of the distributing portion of the machine is an auxiliary frame consisting of legs 35 to which are attached sills 36, while a second sill 37 is likewise attached to the legs 2 of the frame 1.

Across the top of the legs 35 is a counter 38 securely attached to these legs, and cross pieces 39 with braces 40 securely attach the auxiliary frame to the frame 1 in a position parallel to the longitudinal axis of the table 7.

Standard rollers 41 are now placed upon the sills 37 and 36 and these form a means whereby the rollers are suitably supported and whereby the necessary packages may be continuously supplied to the machine, and in their proper place with respect to the distributing gates, for packing.

As great volumes of produce, particularly that of a perishable nature, must be handled during the relatively short period of its harvest, the maximum of packages 42 must be filled in a minimum of time and therefore the packages are movably mounted on the rollers 41, in a plurality of rows, on both sides and adjacent to the distributing portion of the table, and in a position to receive the perfect produce in the shortest period of time.

The packages 42 may be of the usual form of boxes, however the form shown in Fig. 12 and termed "suitcases" is to be preferred. This suitcase is constructed of relatively heavy end boards 43, a light bottom board 44, a similar top board, not shown, and extremely thin side boards 45. Nails are used to secure the boards together in the usual manner and over the ends of the side boards are placed cleats 46.

Now, while these cleats firmly secure the ends of the lighter side boards they also provide a spacer to protect the produce in shipping, as, in trucking and loading in cars, or stacked in storage, the suitcases are piled on their sides, and as they must contain a certain definite number of pounds of the produce, the sides will obviously swell outward, as portrayed in Fig. 12, when the produce is pressed into the package.

Therefore, were it not for the cleats the weight of the suitcases above bearing on the swelled sides would crush the contents and render it unfit for use.

It is now obvious that the cleat 46 is essential and in providing for plural rows of suitcases it is necessary to prevent the cleats on one row of suitcases from coming in contact with the cleats of the adjacent row as, the cleats being quite narrow, they would slip by each other and permit the sides to come in contact, and the proper amount of produce could not be crowded into the package during the packing operation.

For this purpose a guide member 47 is provided to separate the inside row 48 of suitcases from the outside row 49 and this guide member is supported by the frame 1 assisted by the cross pieces 39.

These guide members extend parallel to the machine and are positioned to come between the rows of the packages and thus provide their separation and also maintain the rows in alignment on the rollers 41.

Space is provided between the inner row 48 of packages and the frame 1 for a stationary receptacle 50 in the nature of a box, see Fig. 8, and this box extends parallel to the table with one end registering with the sorting gates 32 to receive the diverted undersize produce and to prevent the accidental deposit of such produce into the suitcases.

The feeding of the packages to the rollers 41 is accomplished by manual means and that the movement of the rows may be only the distance of one package at a time an alarm signal is provided comprising preferably a relatively thin piece of board 51 that is of a yielding nature and that is so designed and so attached to one of the legs 35 that each full movement of a package will pass a cleat by this board and the resultant "snap" will indicate that the packages have been moved far enough to place each successive package in register with the sorting chutes which will now be explained.

Positioned adjacent to the table and in communication with the packages in the respective rows are sorting chutes 52 and 53 respectively.

As will be noted in Fig. 5 the forward chute 52 extends over the inner row 48 of packages and provides a means to direct the discharged produce to a package positioned adjacent to its discharge end, and the rearward chute 52 extends to the inside row 48 of packages and provides means to direct the produce to its respective package in that row.

This method simplifies the filling of the packages for by this means the produce is distributed from the table to the respective rows of packages by gravity and without manual assistance.

The chutes may be solid as shown, or they may be slatted, in the latter of which cases the interstices between the slats would permit dirt and the smaller refuse to fall from the produce. The solid chute however is my preferred form.

In either of the above cases the chutes are positioned on a decline to assist the rapid movement of the produce from the table.

In use the table is set in motion, travelling in the direction of the arrows, the produce is then deposited on the feeding chute 21, from which it will roll by gravity to the cleaning table 15.

Operators stationed adjacent to the cleaning portion of the table now manually remove spoiled and bruised pieces of the produce and the balance continues until intercepted and diverted by the respective gates, as above described.

Other operators stationed against the counter 38, and opposite to the distributing table 16, now press the produce into the packages as it falls from the respective sorting chutes.

The packages are supplied continuously as they are filled, and a nailing operator (not shown) stationed at the end of the rollers nails the top on the suitcase.

In practice the rollers are continued to the cars or other place of deposit without further handling, unless by truck for relatively short distances.

While gravity rollers are herein described it is obvious that power rollers can be used. It is also obvious that while suitcases are used as packages, they being open on the narrow side, yet other packages may be substituted and therefore I do not wish to confine myself to either the specific roller or the specific package described.

Having thus described my invention, I claim—

1. In a produce cleaning, distributing, sorting and packing machine, the combination with a frame, a cleaning and distributing table operably mounted in said frame, and means to operate said table, of slotted adjusting bars adjustably attached to said frame, and distributing and sorting gates adjustably attached to said bars, through said slots, and in operable contiguity with said table.

2. In a produce cleaning, distributing, sorting and packing machine, the combination with a frame, a cleaning and distributing table operably mounted in said frame, and means to operate said table, of slotted end bars rigidly attached to said frame, slotted adjusting bars adjustably attached to said end bars, through said slots, and distributing and sorting gates adjustably attached to said bars, through said last mentioned slots, and in operable contiguity with said table.

In testimony whereof I affix my signature.

FRANK W. SHIELDS.